(12) United States Patent
Adams et al.

(10) Patent No.: US 11,119,310 B2
(45) Date of Patent: *Sep. 14, 2021

(54) LASER ARRAY SIDELOBE SUPPRESSION

(71) Applicant: Lockheed Martin Corporation, Bethesda, MD (US)

(72) Inventors: Dennis John Adams, Stow, OH (US); Thomas Gustav Alley, Broomfield, CO (US); Emanuel Solomon Stockman, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 675 days.

This patent is subject to a terminal disclaimer.

(21) Appl. No.: 15/907,882

(22) Filed: Feb. 28, 2018

(65) Prior Publication Data

US 2018/0188522 A1 Jul. 5, 2018

Related U.S. Application Data

(62) Division of application No. 14/503,976, filed on Oct. 1, 2014, now Pat. No. 9,971,146.

(51) Int. Cl.
| | |
|---|---|
| *G02B 26/08* | (2006.01) |
| *H01S 3/00* | (2006.01) |
| *F41H 13/00* | (2006.01) |
| *H01S 3/23* | (2006.01) |

(52) U.S. Cl.
CPC ............ *G02B 26/08* (2013.01); *H01S 3/0071* (2013.01); *F41H 13/005* (2013.01); *H01S 3/2383* (2013.01)

(58) Field of Classification Search
CPC ..... G02B 26/08; H01S 3/0071; H01S 3/2383; F41H 13/005
See application file for complete search history.

(56) References Cited

U.S. PATENT DOCUMENTS

| | | | | |
|---|---|---|---|---|
| 9,971,146 B2 * | 5/2018 | Adams | .................... | G02B 26/08 |
| 2011/0149359 A1 * | 6/2011 | Leister | ................... | G02B 27/46 |
| | | | | 359/9 |

* cited by examiner

*Primary Examiner* — Georgia Y Epps
*Assistant Examiner* — Don J Williams
(74) *Attorney, Agent, or Firm* — Baker Botts L.L.P.

(57) ABSTRACT

A laser apparatus comprising an aperture module array including two or more aperture modules, each aperture module of the array being optically couple-able to a source of coherent electromagnetic radiation and configured to emit a beam of radiation received from the source. The apparatus emits a composite beam comprising beams emitted by the respective aperture modules and modulates at least one of the beams in power and phase relative to at least one other of the beams such that a desired non-uniform composite beam profile is provided.

8 Claims, 4 Drawing Sheets

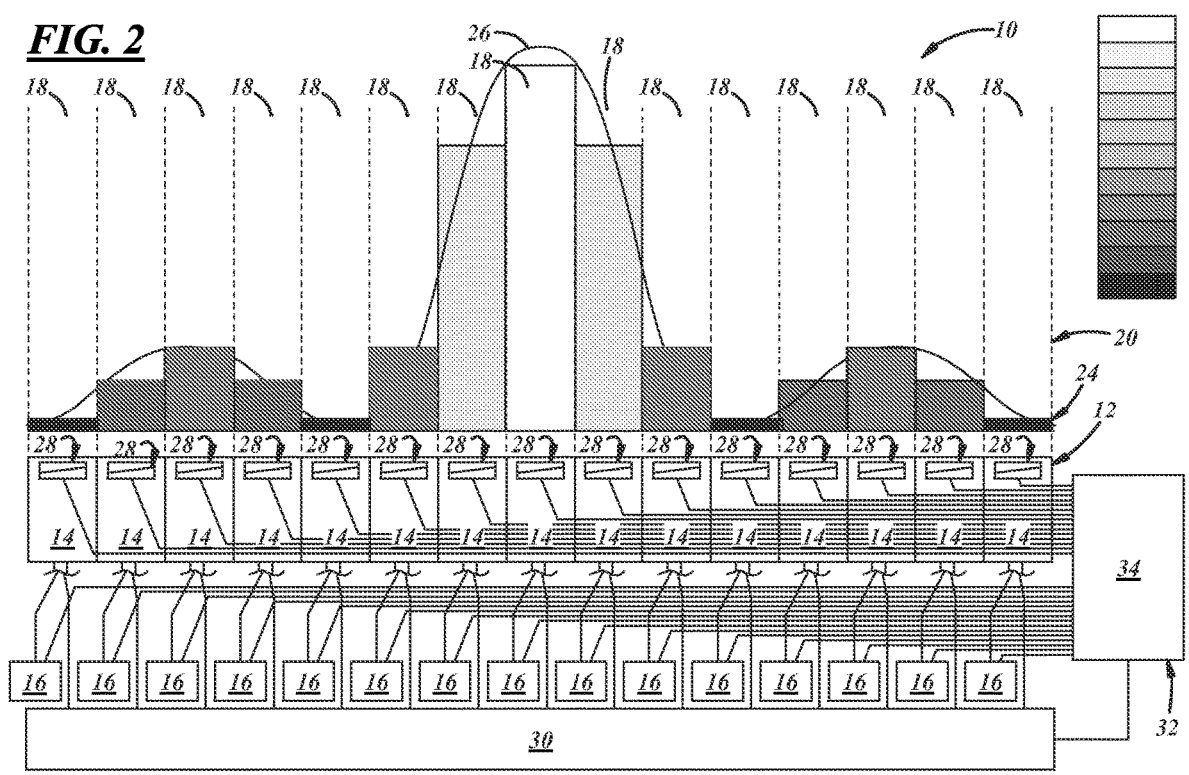

LASER ARRAY SIDELOBE SUPPRESSION

CROSS-REFERENCES TO RELATED APPLICATIONS

This is a U.S. Non-Provisional divisional patent application, which claims the benefit of U.S. Non-Provisional patent application Ser. No. 14/503,976 filed Oct. 1, 2014, the entire contents of which are hereby incorporated by reference.

STATEMENT REGARDING FEDERALLY SPONSORED RESEARCH OR DEVELOPMENT

Not Applicable

BACKGROUND

Field

This application relates generally to a laser array for directing coherent electromagnetic radiation toward a target.

Description of Related Art Including Information Disclosed Under 37 CFR 1.97 and 1.98

When a laser array, such as a high energy phased laser array, is directed toward a target, a significant amount of the array's transmitted radiant energy is diverted into beam sidelobes due to diffraction effects from finite spacing of individual array apertures. A single laser beam having certain transverse energy profiles (for example, having a transverse energy profile corresponding to a zero-order Bessel function) is known to resist diffraction better than a beam having a uniform, or even a Gaussian, transverse energy profile. However, known attempts to impart diffraction-resistant wavefront profiles to a composite beam emitted by a laser aperture array have been limited to geometric arrangement optimization of such aperture arrays. This solution mode is capable of demonstrating significant gains, but the energy diverted to sidelobes is not decreased sufficiently to match the performance of a single monolithic laser beam of similar total diameter.

Laser arrays are also known to employ imaging systems that use digital holographic imaging arrays to collect laser light reflected from a target. Data obtained by such imaging systems is used to generate an image of a portion of a surface of the target, identify and correct for laser distortions caused by aberrations and interference, and provide phase information needed to control the phase of the transmitters in a phased laser array. Known imaging arrays use an array of receive apertures that are positioned remotely from transmit apertures of the array. Such remote placement can be inconvenient or impracticable in airborne and other space and/or weight-limited applications.

SUMMARY

A laser apparatus is provided comprising an aperture module array including one or more sources of coherent electromagnetic radiation. The apparatus also includes two or more aperture modules that are optically coupled to and receive coherent electromagnetic radiation from the one or more sources and emit respective beams of the coherent electromagnetic radiation received from the one or more sources. The apparatus further includes a driving system that is connected to at least one of the sources of coherent electromagnetic radiation and to at least two of the aperture modules, is configured to modulate at least one of the beams emitted by the two or more aperture modules in power and phase relative to a beam emitted by at least one other of the two or more aperture modules such that a desired non-uniform composite beam profile is provided, and is further configured to steer the beams.

Alternatively, the laser apparatus may comprise an aperture module array including three or more aperture modules, with each aperture module of the array being optically couple-able to a source of coherent electromagnetic radiation and configured to emit a beam comprising radiation received from such a source. The apparatus may be configured to provide a desired non-uniform composite beam profile by emitting a composite beam comprising beams emitted by two or more of the aperture modules, modulating at least one of the beams emitted by the two or more aperture modules in power and phase relative to a beam emitted by at least one other of the two or more aperture modules, and causing at least one aperture module to emit no electromagnetic radiation.

DRAWING DESCRIPTIONS

These and other features and advantages will become apparent to those skilled in the art in connection with the following detailed description and drawings of one or more embodiments of the invention, in which:

FIG. 2 is a side schematic cross-sectional view of the apparatus of FIG. 1 taken along line 2-2 of FIG. 1 and including a composite beam profile representation of the different intensities of electromagnetic radiation emitted by the respective aperture modules across the cross-section;

Figure 4:
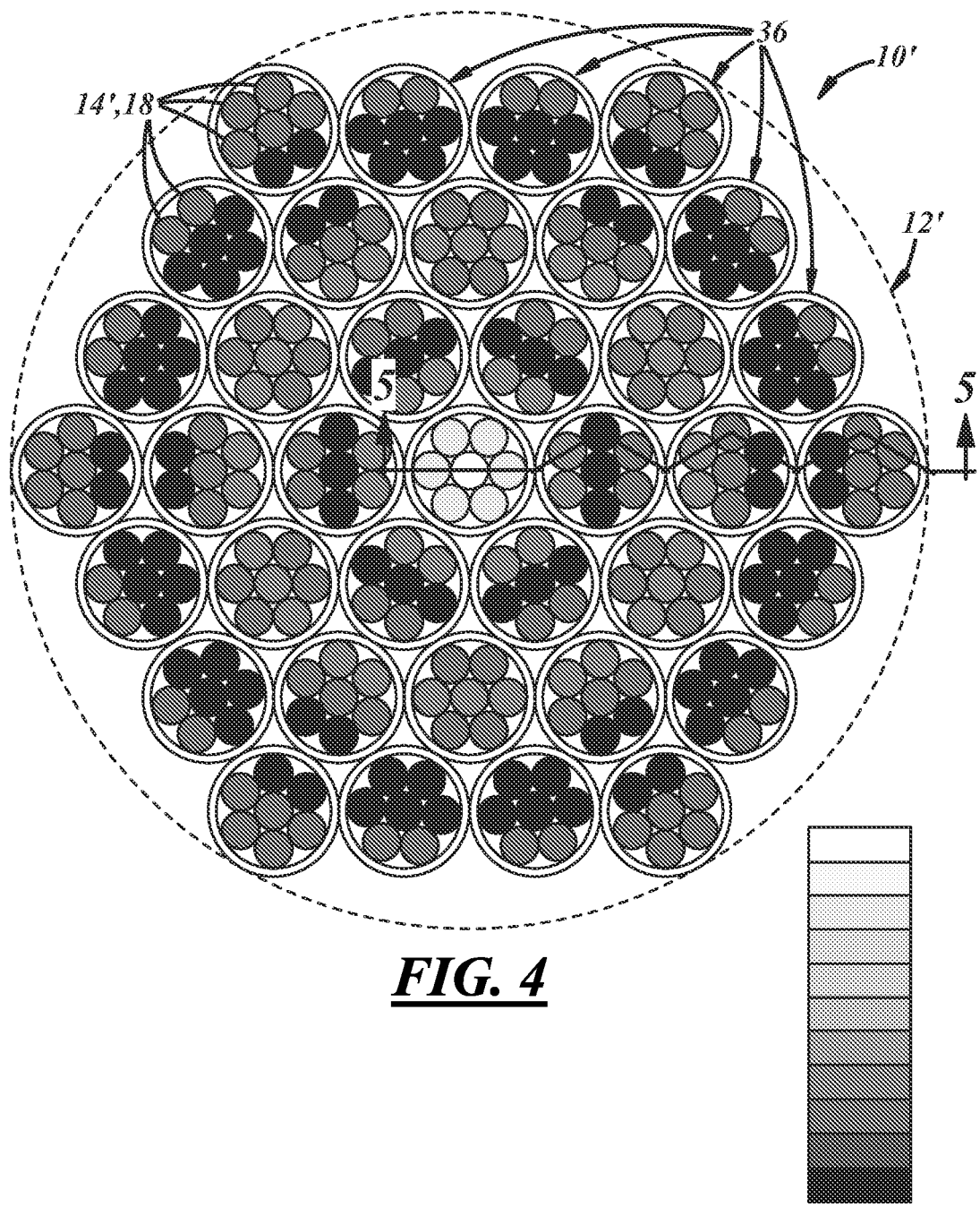
Figure 5:
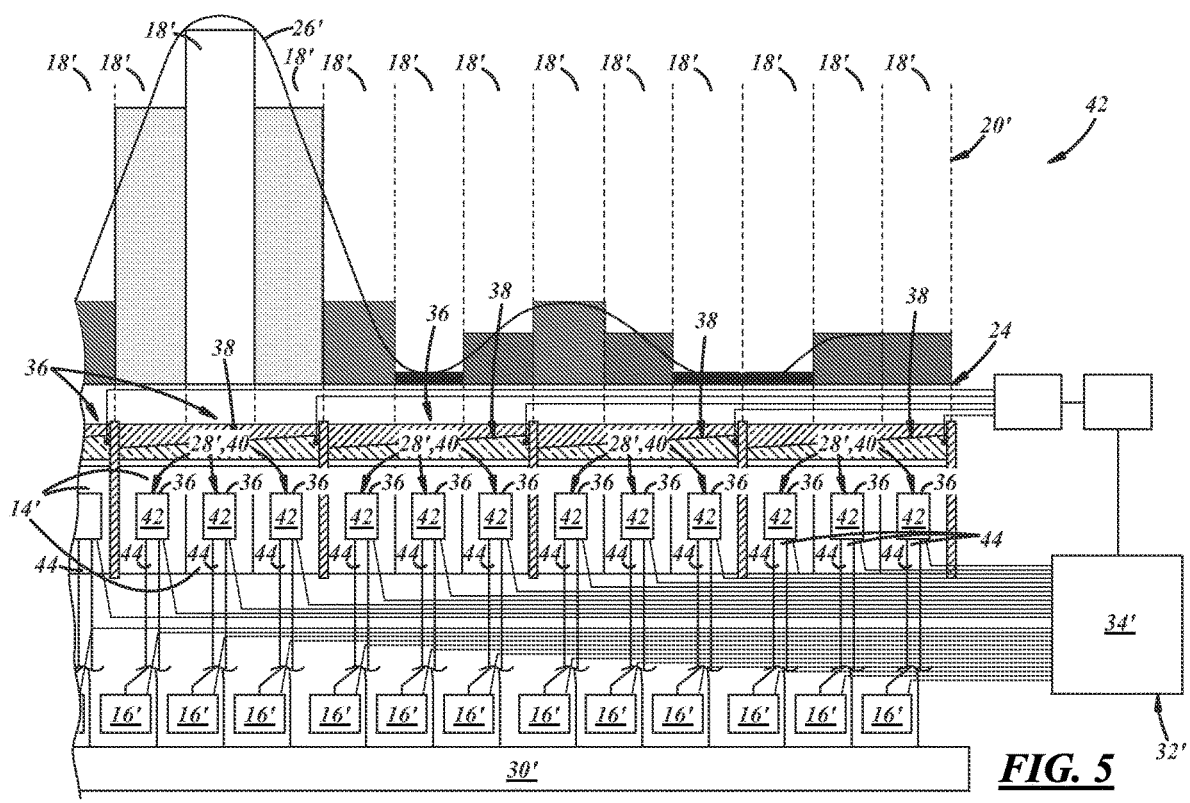

FIG. 4 is a front schematic view of a second embodiment of a sidelobe-suppressing laser apparatus with the apparatus shown emitting a composite beam comprising coherent beams of varying intensities of electromagnetic radiation emitted from respective aperture modules within meta-aperture modules of an aperture module array, the different intensities of electromagnetic radiation being represented in grayscale; and FIG. 5 is a partial side schematic cross-section view of the apparatus of FIG. 4 taken along line 5-5 of FIG. 4 and including a composite beam profile representation of the different intensities of electromagnetic radiation emitted by the respective aperture modules across the cross-section.

DETAILED DESCRIPTION

A sidelobe-suppressing laser apparatus is generally shown at 10 in FIGS. 1-5. A second embodiment of the device is generally shown at 10' in FIGS. 4 and 5. Reference numerals with the designation prime (') in FIGS. 4 and 5 indicate alternative configurations of elements that also appear in the first embodiment. Unless indicated otherwise, where a portion of the following description uses a reference numeral to refer to FIGS. 1-3, that portion of the description applies equally to elements designated by primed numerals in FIGS. 4 and 5.

Figure 1:
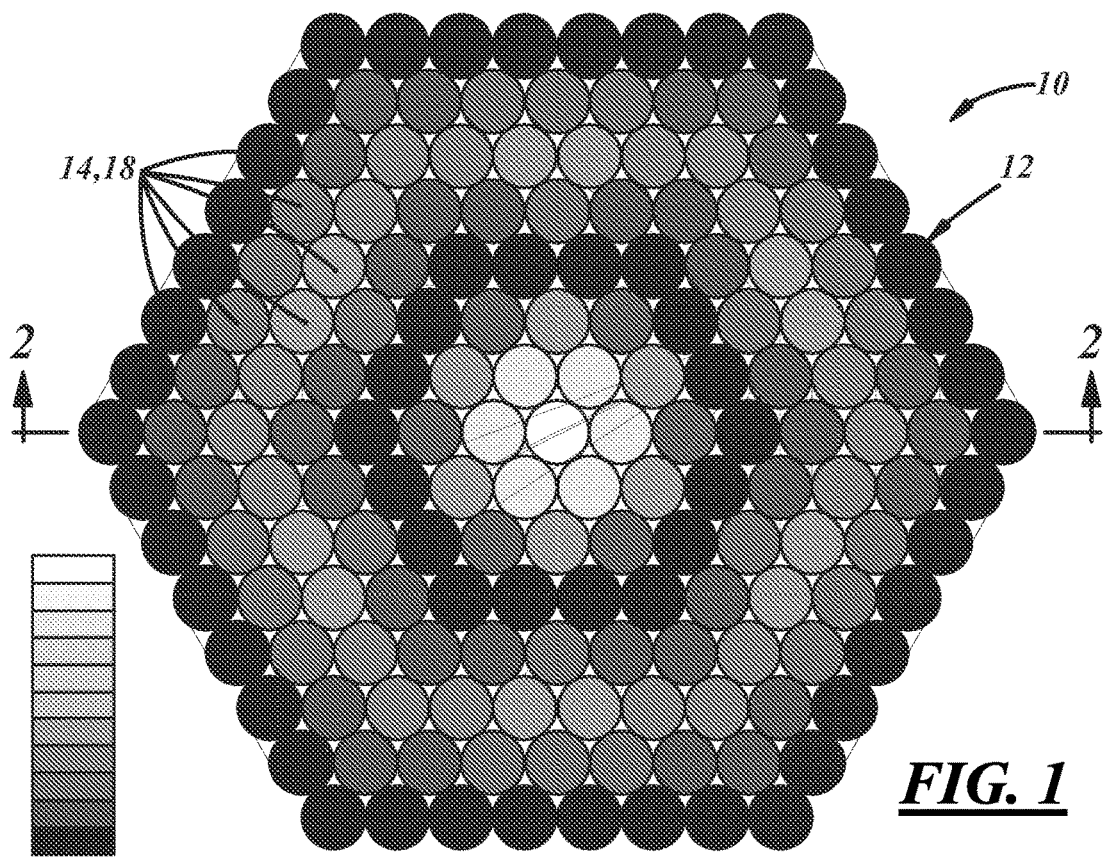
FIG. 1 is a front schematic view of a sidelobe-suppressing laser apparatus shown emitting a composite beam comprising coherent beams of electromagnetic radiation emitted from respective aperture modules of an aperture array, the differing intensities of electromagnetic radiation of each beam being represented in grayscale.

The apparatus 10 may comprise an aperture module array 12 including two or more aperture modules 14, each aperture module 14 of the array 12 being optically couple-able to a source 16 of coherent electromagnetic radiation (e.g., a laser) and configured to emit a beam 18 comprising such radiation received from the source 16 as shown in FIG. 2. As shown in FIG. 1, the array 12 may include, for example, one hundred ninety-nine aperture modules 14 arranged in a hexagonal grid. In other embodiments the array 12 may include any number of aperture modules 14 arranged in any suitable pattern.

The apparatus 10 is configured to emit a composite beam 20 and to direct the composite beam 20 toward a target 22. The composite beam 20 comprises beams 18 emitted by the respective aperture modules 14. At least one of the beams 18 emitted by the respective aperture modules 14 may be modulated in power and phase relative to a beam 18 emitted toward the target 22 by at least one other of the aperture modules 14 such that a desired non-uniform composite beam profile 24 is provided.

In this description, the term "aperture module 14" means a module configured and positioned to receive electromagnetic radiation from a source 16 of coherent electromagnetic radiation and to emit that electromagnetic radiation in the form of a beam 18.

In this description, the term "composite beam profile 24" is intended as a collective reference to a pattern of intensities of respective beams 18 that make up a composite beam 20 emitted by the apparatus 10. Accordingly, the term "non-uniform composite beam profile 24" is intended to refer to a composite beam intensity profile in which the intensities of the respective beams 18 of the composite beam 20 are not all equal to each other. Cross sections of representative composite beam profiles are shown in FIGS. 2 and 5.

As shown in FIG. 2, the apparatus 10 may be configured to provide a non-uniform composite beam profile 24 that approximates a Bessel function 26, thereby improving the resistance of the composite beam 20 to diffraction and sidelobe energy loss. However, the apparatus 10 may be configured to modulate the electromagnetic beams 18 emitted by the aperture modules 14 to provide any other desired non-uniform composite beam profile 24.

These beam profile approximations may be improved by the employment of image enhancement techniques. A non-uniform composite beam profile 24 permits aperture modules 14 to be assigned null transmission values, which are ideal for receiving and imaging. This addresses the need to perform aperture corrections from on-axis imagers within the array. For example, anti-aliasing techniques may be used to "soften" contours projected by the hexagonal matrix pattern of the aperture array 12 to present an apparently smoother approximation of the more rounded Bessel function 26.

Figure 3:
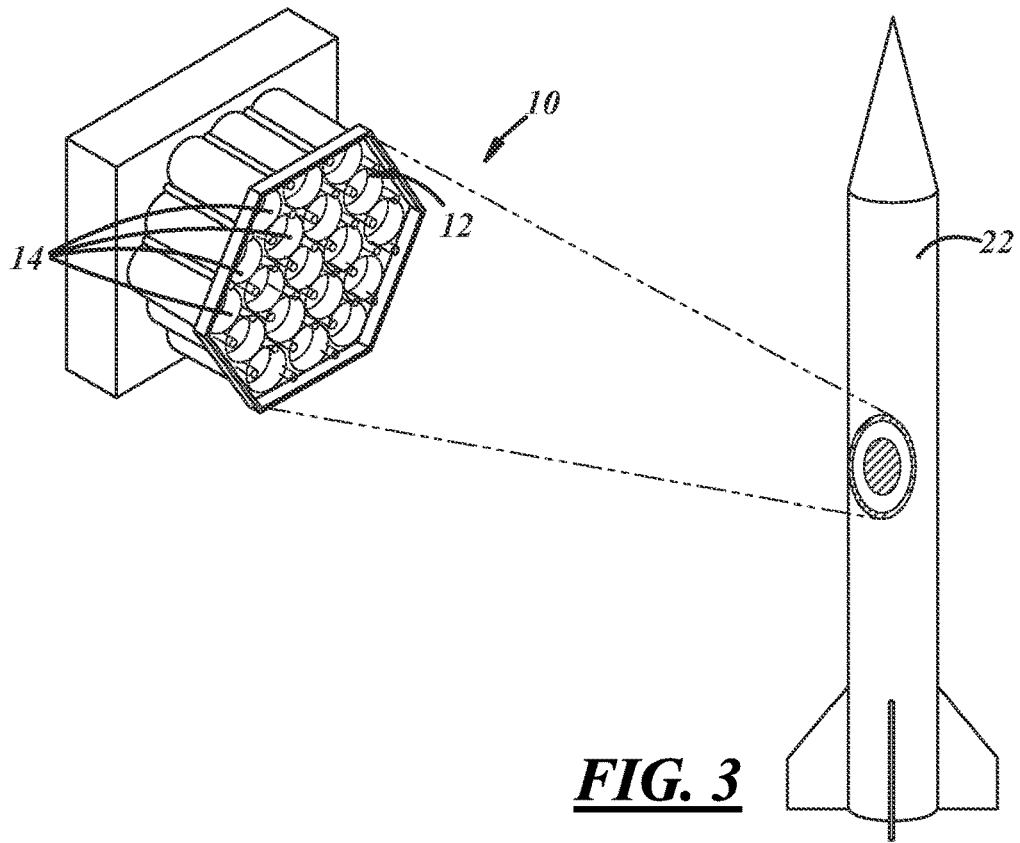
FIG. 3 is a side perspective view of the apparatus of FIG. 1 engaging a target missile, and showing a stylized representation of the impingement of a composite beam on a target, with the transmitted beam having an approximated Bessel beam profile.

As shown in FIG. 2, each aperture module 14 may include a steering module 28 configured to direct electromagnetic radiation that passes through the aperture module 14. The steering module 28 may be used to direct or steer an emitted beam 18 of such electromagnetic radiation toward a desired point on a target 22 (as shown in FIG. 3), or to aim toward and receive radiation from a desired direction. The steering module 28 may be of any suitable type including, for example, a Risley Integrated Steering Module such as is disclosed in U.S. Pat. No. 7,898,712.

As shown in FIGS. 1 and 2, the apparatus 10 may be configured to provide a desired non-uniform composite beam profile 24 by modulating the beams 18 emitted by the aperture modules 14 such that the one or more of the aperture modules 14 emit electromagnetic radiation at a first level of intensity while one or more other of the aperture modules 14 emit electromagnetic radiation of a second lesser or greater level of intensity. Alternatively, or in addition, the apparatus 10, may be configured to provide a desired non-uniform composite beam profile 24 by modulating the electromagnetic output of the aperture modules 14 such that one or more of the aperture modules 14 emit electromagnetic radiation at a first level of intensity while one or more other of the aperture modules 14 emit no electromagnetic radiation at all. In other words, many desired composite beam profiles may not require any output at all from certain aperture modules 14 of the aperture module array 12.

As shown in FIG. 2, the apparatus 10 may include an imaging processor 30 connected in communication with and configured to receive imaging information from the aperture modules 14. The imaging processor 30 may be configured to determine target information by interpreting information received from certain aperture modules 14 of the array 12 that are receiving electromagnetic radiation from the target 22 but are not emitting electromagnetic radiation toward the target 22. For example, laser emissions from a composite beam 20 emitted by the array 12 may reflect back from a target 22, with some of this reflected radiation being received by the aperture modules 14. The aperture modules 14 may then communicate information to the processor 30 regarding the received radiation. The processor 30 may, in turn, be configured to calculate target information based on the information received from aperture modules 14 that are receiving reflected radiation from the target 22 rather than emitting beams 18 at the target 22. Aperture modules 14 that are emitting beams 18 may not be usable by the processor 30 to calculate target information via received radiation, as they may be saturated with backscatter from their emitted beams 18. However, aperture modules 14 that are emitting beams 18 may be usable by the processor 30 to calculate target information if the received radiation is from a separate illuminator source and of a different wavelength. The processor 30 may therefore be configured to use information received from non-emitting and/or emitting aperture modules 14 to generate a digital holographic image of the surface of the target 22.

As shown in FIG. 2, the apparatus 10 may include a driving system 32 that may be connected to the source 16 (or sources) of coherent electromagnetic radiation, and to one or more aperture modules 14. The driving system 32 may be configured to command the source(s) 16 and one or more aperture modules 14 to modify their respective electromagnetic outputs. The imaging processor 30 may be connected to the driving system 32 and configured to provide the driving system 32 with target information. The driving system 32 may be configured to modify the beams emitted by the aperture modules 14 in response to the target information received from the imaging processor 30. The driving system 32 may, for example, include a driving processor 34 that is in communication with the electromagnetic radiation sources 16 and the steering modules 28, and that may be programmed or otherwise configured to command the source 16 and the steering modules 28 to alter the direction, intensity, and/or phase of beams 18 comprising the composite beam 20 in response to target information received from the imaging processor 30.

According to the second embodiment, and as shown in FIGS. 4 and 5, the apparatus 10' may include a plurality of meta-aperture modules 36, each such meta-aperture module 36 comprising a plurality of aperture modules 14' of the aperture module array 12', and each meta-aperture module 36 being configured to steer the beams emitted by its aperture modules 14' via meta-aperture steering modules 38. Each such meta-aperture steering module 38 may be configured to collectively direct beams of electromagnetic radiation 18 that pass through the aperture modules 14' within a meta-aperture 36. According to this second embodiment, each meta-aperture steering module 38 may be connected to the driving system 32', and may comprise a Risley Integrated Steering Module, but other embodiments may employ any other suitable type of meta-aperture module steering arrangement.

As shown in FIG. 4, the apparatus 10' of the second embodiment may include thirty-seven meta-aperture modules 36, and each may comprise a cluster or sub-array of seven aperture modules 14'. As is also shown in FIG. 4, the meta-aperture modules 36 may be arranged in a hexagonal grid, and the aperture modules 14' may be arranged in hexagonal grids within each meta-aperture module.

In the second embodiment, each aperture steering module 28' may comprise a steerable light fiber laser output device 40, as shown in FIG. 5. The steerable light fiber laser output device 40 may comprise a steering mechanism 42 operably connected to a light fiber 44 such as a fiber-optic cable that is couple-able to the coherent electromagnetic radiation source 16. The steering mechanism 42 may be configured to manipulate the orientation of an output end of the light fiber 44 to aim in a desired direction a laser beam 18 emitted from the output end of the light fiber 44. The steering mechanism 42 may comprise a fine-steering Risley Integrated Steering Module, a piezo-activated micro-gimbal or actuator, an electronically-controlled liquid crystal steering element, or any other suitable arrangement for steering laser beams from fiber outputs.

In other words, beams emitted by an aperture module 14' of a meta-aperture module 36 may be steered by its aperture steering module 28' and, either simultaneously or sequentially, by the meta-aperture steering module 38 of the meta aperture module 36. Since any type of steering device may be assigned to either the aperture or meta-aperture steering modules 28', 38, different steering tasks may be divided among them. For example; in the second embodiment, the aperture steering modules 28' may be used for fine steering adjustments, while the meta-aperture steering modules 38 may be used for coarse steering adjustments.

An apparatus constructed as described above minimizes energy waste by emitting a sidelobe-suppressing composite beam. It can also observe the effect and disposition of the composite beam upon a target without having to remotely locate an array of receive apertures. This allows the apparatus to make adjustments to compensate for disruptions such as atmospheric distortions, target shape, and target motion, thereby providing a more pronounced desired effect upon a target.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A laser apparatus comprising:
    one or more sources of coherent electromagnetic radiation;
    an aperture module array comprising two or more aperture modules that are optically coupled to and receive coherent electromagnetic radiation from the one or more sources and emit respective beams of the coherent electromagnetic radiation received from the one or more sources; and
    a driving system that is connected to at least one of the sources of coherent electromagnetic radiation and to at least two of the aperture modules, is configured to modulate at least one of the beams emitted by the two or more aperture modules in power and phase relative to a beam emitted by at least one other of the two or more aperture modules such that a desired non-uniform composite beam profile is provided, and is further configured to steer the beams.

2. A laser apparatus as defined in claim 1 in which the apparatus is configured to provide a desired non-uniform composite beam profile resembling at least part of a zero order Bessel function.

3. A laser apparatus as defined in claim 1, in which the apparatus is configured to provide a desired non-uniform composite beam profile by causing at least one aperture module to emit electromagnetic radiation while causing at least one other aperture module to emit no electromagnetic radiation.

4. A laser apparatus as defined in claim 3 including an imaging processor connected in communication with at least one aperture module and configured to determine target information by interpreting information received from at least one aperture module that is not emitting electromagnetic radiation.

5. The laser apparatus of claim 1, wherein:
    the respective beams emitted from the two or more aperture modules together form a composite beam emitted from the laser apparatus, the two or more aperture modules comprising a first aperture module and a second aperture module; and
    the non-uniform composite beam profile is applied to the emitted composite beam such that:
        the first aperture module emits electromagnetic radiation at a first level of intensity; and
        the second aperture module emits electromagnetic radiation at a second level of intensity that is lesser or greater than the first level of intensity.

6. The laser apparatus of claim 1, further comprising an imaging processor configured to:
    determine target information by interpreting information received from at least one aperture module that is not emitting electromagnetic radiation; and
    provide the determined target information to the driving system, wherein at least one of the beams is modulated in power and phase in response to the determined target information received from the imaging processor.

7. A laser apparatus comprising:
    an aperture module array including three or more aperture modules;
    each aperture module of the array being optically couple-able to a source of coherent electromagnetic radiation and configured to emit a beam comprising radiation received from such a source;

the apparatus being configured to provide a desired non-uniform composite beam profile by:
emitting a composite beam comprising beams emitted by two or more of the aperture modules,
modulating at least one of the beams emitted by the two or more aperture modules in power and phase relative to a beam emitted by at least one other of the two or more aperture modules, and
causing at least one aperture module to emit no electromagnetic radiation.

8. A laser apparatus as defined in claim 7 in which the apparatus is configured to provide a desired non-uniform composite beam profile resembling at least part of a zero order Bessel function.

* * * * *